United States Patent
Wu et al.

(10) Patent No.: US 8,953,044 B2
(45) Date of Patent: Feb. 10, 2015

(54) MULTI-RESOLUTION VIDEO ANALYSIS AND KEY FEATURE PRESERVING VIDEO REDUCTION STRATEGY FOR (REAL-TIME) VEHICLE TRACKING AND SPEED ENFORCEMENT SYSTEMS

(75) Inventors: Wencheng Wu, Webster, NY (US);
Edgar A. Bernal, Webster, NY (US);
Robert P. Loce, Webster, NY (US);
Martin E. Hoover, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 614 days.

(21) Appl. No.: 13/253,261

(22) Filed: Oct. 5, 2011

(65) Prior Publication Data

US 2013/0088600 A1    Apr. 11, 2013

(51) Int. Cl.
*H04N 7/18* (2006.01)
*G06K 9/00* (2006.01)
*H04N 19/33* (2014.01)
*H04N 19/463* (2014.01)
*H04N 19/59* (2014.01)
*G08G 1/054* (2006.01)

(52) U.S. Cl.
CPC .............. *G06K 9/00785* (2013.01); *H04N 7/18* (2013.01); *H04N 19/00436* (2013.01); *H04N 19/00551* (2013.01); *H04N 19/00757* (2013.01); *G08G 1/054* (2013.01); *G06K 9/00993* (2013.01)
USPC ........... 348/149; 348/143; 348/144; 348/145; 348/146; 348/147; 348/148; 348/150; 348/151; 348/152; 348/153; 348/154; 348/155; 348/156; 348/157; 348/158; 348/159; 348/160

(58) Field of Classification Search
CPC .................. H04N 19/00436; H04N 19/00551; H04N 19/00757; H04N 7/18; G08G 1/054; G08G 9/00785; G08G 9/00993
USPC ......................................................... 348/149
See application file for complete search history.

(56) References Cited

U.S. PATENT DOCUMENTS 4,887,080 A * 12/1989 Gross ............................ 340/937
5,530,441 A *  6/1996 Takatou et al. ............... 340/937

(Continued)

OTHER PUBLICATIONS

Melo et al, Viewpoint Independent Detection of Vehicle Trajectories and Lane Geometry from Uncalibrated Traffic Surveillance Cameras, Oct. 2004.*

(Continued)

*Primary Examiner* — Andy Rao
*Assistant Examiner* — Shan Elahi
(74) *Attorney, Agent, or Firm* — Fay Sharpe LLP

(57) ABSTRACT

Systems and methods are disclosed that include a video-based analysis system that detects, tracks and archives vehicles in video stream data at multiple resolutions. The system includes an image capturing device that captures video stream data having video at a first high resolution. A vehicle detection module detects at least one vehicle within the video. A vehicle analysis module is configured to analyze the video and to extract one or more key vehicle features from the video to enable identification of a vehicle of interest (VOI) according to a set of predetermined criteria. A subsampling module creates a reduced resolution video stream in a second subsampled resolution that is lower than the first high resolution while maintaining the one or more extracted key features within the reduced resolution video stream in the first high resolution, and archives the reduced resolution video stream into a video database.

21 Claims, 8 Drawing Sheets

(56) References Cited

U.S. PATENT DOCUMENTS

| | | | |
|---|---|---|---|
| 5,774,569 A * | 6/1998 | Waldenmaier | 382/100 |
| 5,777,951 A * | 7/1998 | Mitschele et al. | 368/90 |
| 5,912,822 A * | 6/1999 | Davis et al. | 702/143 |
| 5,948,038 A * | 9/1999 | Daly et al. | 701/117 |
| 5,978,035 A * | 11/1999 | Geshwind | 348/441 |
| 6,081,206 A * | 6/2000 | Kielland | 340/937 |
| 6,121,898 A * | 9/2000 | Moetteli | 340/933 |
| 6,223,125 B1 * | 4/2001 | Hall | 701/301 |
| 6,266,627 B1 * | 7/2001 | Gatsonides | 702/143 |
| 6,281,808 B1 * | 8/2001 | Glier et al. | 340/933 |
| 6,377,191 B1 * | 4/2002 | Takubo | 340/937 |
| 6,442,474 B1 * | 8/2002 | Trajkovic et al. | 701/117 |
| 6,466,260 B1 * | 10/2002 | Hatae et al. | 348/149 |
| 6,546,119 B2 * | 4/2003 | Ciolli et al. | 382/104 |
| 6,573,929 B1 * | 6/2003 | Glier et al. | 348/149 |
| 6,647,361 B1 * | 11/2003 | Laird et al. | 703/8 |
| 6,757,008 B1 * | 6/2004 | Smith | 348/143 |
| 6,882,930 B2 * | 4/2005 | Trayford et al. | 701/117 |
| 6,950,789 B2 * | 9/2005 | Laird et al. | 703/8 |
| 6,970,102 B2 * | 11/2005 | Ciolli | 340/933 |
| 7,039,116 B1 * | 5/2006 | Zhang et al. | 375/240.26 |
| 7,346,222 B2 | 3/2008 | Lee et al. | |
| 7,382,277 B2 * | 6/2008 | Ioli Trust | 340/932.2 |
| 7,440,589 B2 * | 10/2008 | Garoutte | 382/103 |
| 7,460,691 B2 * | 12/2008 | Ng et al. | 382/107 |
| 7,489,257 B2 * | 2/2009 | Izakov | 340/973 |
| 7,791,501 B2 * | 9/2010 | Ioli | 340/932.2 |
| 8,120,513 B2 * | 2/2012 | Ioli | 340/932.2 |
| 8,179,282 B1 * | 5/2012 | MacCarley | 340/933 |
| 8,849,554 B2 * | 9/2014 | Aubrey et al. | 701/118 |
| 2002/0019703 A1 * | 2/2002 | Levine | 701/301 |
| 2002/0060640 A1 * | 5/2002 | Davis et al. | 342/104 |
| 2002/0072963 A1 * | 6/2002 | Jonge | 705/13 |
| 2002/0140577 A1 * | 10/2002 | Kavner | 340/933 |
| 2003/0185302 A1 * | 10/2003 | Abrams, Jr. | 375/240.12 |
| 2004/0001142 A1 * | 1/2004 | Kumhyr | 348/143 |
| 2004/0104813 A1 * | 6/2004 | Rau et al. | 340/425.5 |
| 2004/0252193 A1 * | 12/2004 | Higgins | 348/149 |
| 2005/0140523 A1 * | 6/2005 | Publicover | 340/907 |
| 2005/0151671 A1 * | 7/2005 | Bortolotto | 340/936 |
| 2005/0213815 A1 * | 9/2005 | Garoutte | 382/171 |
| 2006/0030985 A1 * | 2/2006 | Lawida et al. | 701/35 |
| 2006/0092043 A1 * | 5/2006 | Lagassey | 340/907 |
| 2006/0095199 A1 * | 5/2006 | Lagassey | 701/117 |
| 2006/0147085 A1 * | 7/2006 | Wren et al. | 382/103 |
| 2006/0212193 A1 * | 9/2006 | Breed | 701/29 |
| 2006/0269105 A1 * | 11/2006 | Langlinais | 382/105 |
| 2006/0274917 A1 * | 12/2006 | Ng et al. | 382/103 |
| 2007/0021915 A1 * | 1/2007 | Breed et al. | 701/301 |
| 2007/0160142 A1 * | 7/2007 | Abrams, Jr. | 375/240.12 |
| 2007/0263899 A1 * | 11/2007 | Garoutte | 382/103 |
| 2008/0040029 A1 * | 2/2008 | Breed | 701/208 |
| 2008/0042812 A1 * | 2/2008 | Dunsmoir et al. | 340/435 |
| 2008/0060034 A1 | 3/2008 | Egnal et al. | |
| 2008/0068461 A1 * | 3/2008 | Izakov | 348/148 |
| 2008/0094250 A1 * | 4/2008 | Myr | 340/909 |
| 2008/0129475 A1 * | 6/2008 | Breed et al. | 340/438 |
| 2008/0133136 A1 * | 6/2008 | Breed et al. | 701/301 |
| 2008/0166023 A1 | 7/2008 | Wang | |
| 2008/0252485 A1 * | 10/2008 | Lagassey | 340/907 |
| 2008/0270569 A1 * | 10/2008 | McBride et al. | 709/217 |
| 2008/0317357 A1 * | 12/2008 | Steinberg et al. | 382/209 |
| 2009/0208054 A1 * | 8/2009 | Angell et al. | 382/103 |
| 2009/0219387 A1 * | 9/2009 | Marman et al. | 348/143 |
| 2009/0240695 A1 * | 9/2009 | Angell et al. | 707/7 |
| 2010/0052945 A1 * | 3/2010 | Breed | 340/903 |
| 2010/0054540 A1 * | 3/2010 | Brown et al. | 382/107 |
| 2010/0060727 A1 * | 3/2010 | Steinberg et al. | 348/77 |
| 2010/0118982 A1 * | 5/2010 | Chatterjee et al. | 375/240.29 |
| 2010/0124274 A1 | 5/2010 | Cheok et al. | |
| 2010/0169007 A1 * | 7/2010 | Kaushik et al. | 701/208 |
| 2010/0272187 A1 * | 10/2010 | Civanlar et al. | 375/240.25 |
| 2011/0103773 A1 * | 5/2011 | Johnson et al. | 386/290 |
| 2011/0234749 A1 * | 9/2011 | Alon | 348/36 |
| 2012/0062732 A1 * | 3/2012 | Marman et al. | 348/142 |
| 2012/0069222 A1 * | 3/2012 | Steinberg et al. | 348/239 |

OTHER PUBLICATIONS

MacCarley et al, Video-based Vehicle Signature Analysis and Tracking Phase 1: Verification of Concept Preliminary Testing, Jan. 1, 1998.*

Dailey et al, Video Image Processing to Create a Speed Sensor, Mar. 1999.*

Cucchiara et al, Real-time detection of moving vehicles, 1999.*

Arthur et al, Video-based Vehicle Signature Analysis and Tracking System Phase 2: Algorithm Development and Preliminary Testing, Feb. 1, 2001.*

Anagnostopoulos et al, Intelligent traffic management through MPEG-7 vehicle flow surveillance, 2006.*

* cited by examiner

NATIVE ↓2IMAGE FRAMES AROUND DETECTION OF 1ST VEHICLE

PSEUDO SUPER-RESOLUTION ↓2IMAGE FRAMES OF THE DETECTION OF 1ST VEHICLE (W/ COMPRESSION)

PSEUDO SUPER-RESOLUTION ↓2IMAGE FRAMES OF THE DETECTION OF 1ST VEHICLE (W/O COMPRESSION)

NAIVE ↓2

PSEUDO SUPER-RESOLUTION ↓2 (W/ COMPRESSION)

PSEUDO SUPER-RESOLUTION ↓2 (W/O COMPRESSION)

MULTI-RESOLUTION VIDEO ANALYSIS AND KEY FEATURE PRESERVING VIDEO REDUCTION STRATEGY FOR (REAL-TIME) VEHICLE TRACKING AND SPEED ENFORCEMENT SYSTEMS

BACKGROUND

The exemplary embodiment relates to fields of image processing. It finds particular application in connection with the provision of analysis and preserving of captured images, and is described with particular reference thereto. However, a more general application can be appreciated with regards to image classification, image content analysis, image archiving, image database management, searching, and so forth.

Video for transportation applications, such as law enforcement and speed detection, for example, currently desire high bandwidth and large data storage to preserve key features and vehicle identification information within the video data. A significant portion of the video data is not necessary to preserve this information. Other uses of the same video data, such as traffic flow estimation, traffic control, and trajectory analysis, can use low resolution video data. It is thus desirable to reduce the system data requirements while maintaining resolutions needed for vehicle identification.

BRIEF DESCRIPTION

The following presents a simplified summary in order to provide a basic understanding of one or more aspects of the disclosure. This summary is not an extensive overview and is neither intended to identify key or critical elements, nor to delineate the scope thereof. Rather, the primary purpose of the summary is to present some concepts of the disclosure in a simplified form as a prelude to the more detailed description that is presented later.

The present invention is a multi-resolution transportation video analysis and encoding system, where the multiple resolutions enable preservation of key features at high resolution and other video data at lower resolution, thereby reducing data processing and storage requirements without loss of key information.

In one embodiment, a video-based analysis and tracking system comprises a vehicle analysis module that analyzes video data frames containing a detected vehicle and extracts a plurality of key vehicle features from the video to identify a vehicle of interest (VOI) according to a set of predetermined criteria. A subsampling module reduces resolution of the video stream data to a second lower resolution that is at least one of a spatial resolution and a temporal resolution while maintaining at least one of the extracted key features in the first resolution and archives the video at the second resolution into a video database.

A method for a video analysis system executed via at least one processor with a memory storing executable instructions to execute the method. The method includes capturing video stream data having video data frames at a first resolution in an image capture device. A vehicle is detected within the video data frames with a detection module. The method further includes extracting one or more key vehicle features from the video data frames having the vehicle detected. A vehicle of interest is identified according to a set of predetermined criteria related to vehicle analytic data from the video frames having the vehicle. The video stream data is then reduced in resolution with a subsampling module to a video data stream having a second resolution while maintaining one or more extracted key features in the first resolution that is a higher resolution than the second resolution.

The following description and annexed drawings set forth in detail certain illustrative aspects and implementations of this disclosure. These are indicative of only a few of the various ways in which the principles of the disclosure may be employed.

DETAILED DESCRIPTION

Figure 1:
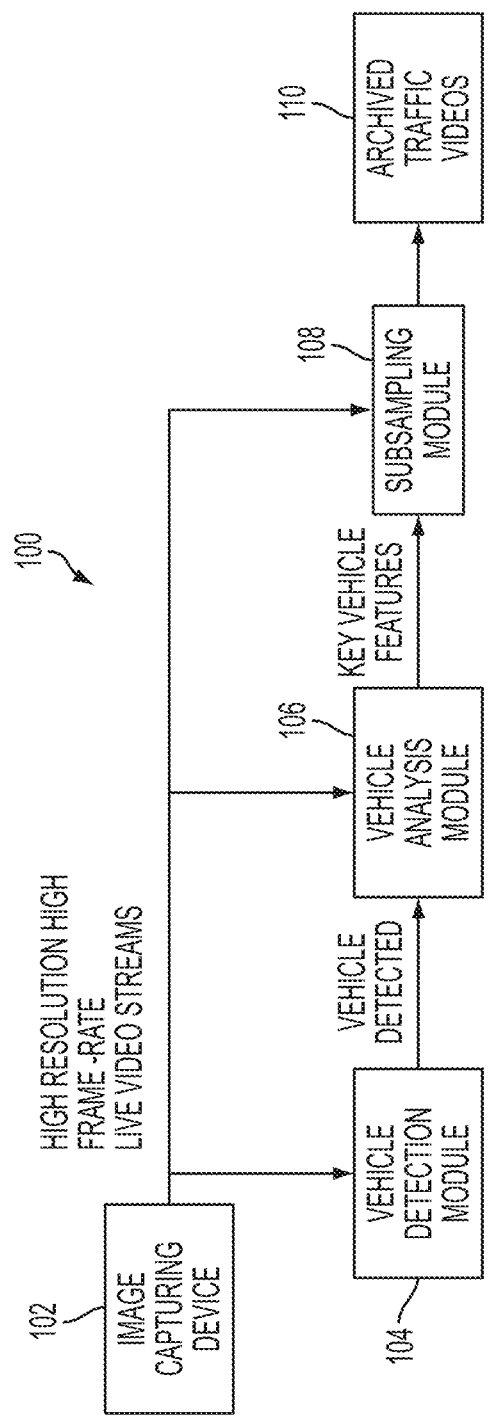
FIG. 1 is an illustration of one aspect of an exemplary embodiment of a video analysis system in accordance with the present disclosure.

One or more implementations of the present disclosure will now be described with reference to the attached drawings, wherein like reference numerals are used to refer to like elements throughout. Aspects of the exemplary embodiment relate to systems and methods using image capturing devices, such as video camera(s), devices with video data streaming modules and the like. A video analysis system, for example, includes at least one image capturing device to acquire dynamic and/or static images. The image capturing device is provided as one or more sensors coupled to one or more analyzer components for video processing of the video stream data captured by the device. A vehicle detection module detects the presence of objects, such as vehicles, moving objects, or the like, and tracks the object by measuring data (e.g., vehicle position, speed, trajectory information) pertaining to the objects or vehicles captured by the video stream data of the image device. The detection module detects the objects within a region of interest of the data frames or of a section of highway being video recorded, for example, in the case of a vehicle. A vehicle analysis module extracts and stores the identities of Vehicles Of Interest (VOI) according to a set of predetermined criteria (e.g., those that exceed the speed limit, fit various descriptions, such as plate description, facial feature of driver and/or passengers, vehicle description, etc.). In order to achieve accuracy and other legal requirements, the desired sensor characteristics may differ at different stages of the process. For example, speed measurement may be performed with moderate resolution image frames (at least two frames of the same vehicle separated by a known time stamp), while extracting the identities of vehicles of interest (e.g., recognizable license plate, driver facial features, or other identifying information) is optimal with high resolution image frame(s).

In an exemplary aspect of the present disclosure, a video analysis and tracking system uses multi-resolution video analysis and a key feature preserving, video reduction strategy for (real-time) vehicle tracking and speed enforcement. Here, "video reduction" refers to the process of subsampling (in the spatial and/or temporal domain) and/or compressing the video. The system, for example, comprises the following: (1) High resolution, high frame rate video acquisition module; (2) Vehicle tracking and speed measurement module using multi-resolution video analysis; (3) Vehicle of Interest (VOI) Determination module; (4) Vehicle Identification module (5) Video data subsampling module; (6) Module that associates the high resolution vehicle identification or key feature video data with locations within the subsampled video.

Current methods impose significant challenges on real-time or near real-time processing, data-transmission and data storage requirements for archival purposes or off-line processing etc. What is needed is thus an efficient and effective solution for video applications where different functions have different preferred operating resolutions and enable more efficient archival storage of the data obtained.

FIG. 1 illustrates an overview of an exemplary system 100 for analyzing, tracking and archiving video data for a vehicle, such as a video-based analysis and tracking system. Although a vehicle is described in the example of FIG. 1, the disclosure is not limited to only vehicles and may include any objects or living things moving within a view, whether by combustion, electricity, hydrolysis, magnetism, fluid, gas, air, or any other driving source. The system 100 includes an image capturing device 102, such as video camera or other device that is able to capture streaming video data. The image capturing device 102 captures video stream data having image frames of objects within a field of view. The video frame data captured is analyzed by a detection module 104 that determines the presence of a vehicle within the frames. A vehicle analysis module 106 analyzes the video data frames containing the detected vehicle and extracts one or more key vehicle features from the video to determine whether the vehicle is a VOI according to a set of predetermined criteria. The video-based system 100 further includes a subsampling module 108 that reduces the video stream captured by the device 102 to a different resolution than the resolution captured in by the image capturing device 102, while concurrently maintaining one or more extracted key features in the video stream from data frames within the captured resolution.

In one embodiment, the analysis and vehicle tracking system 100 is configured to archive in a database 110 key features at a high resolution and other video data at lower resolutions than the resolution that the video data was originally captured in. The subsampling module 108 reduces the video stream of the image capturing device by compressing the video data frames of the video stream captured and merging the compressed video data frames with vehicle analytic data, key feature data and other metadata pertaining to the vehicle within the frames captured. In addition, key features are preserved at a higher resolution than the compressed video stream and merged into the data stream. Video compression refers to reducing the quantity of data used to represent digital video images, and is a combination of spatial image compression and temporal motion compensation that reduces temporal redundancies between (temporally) adjacent frames. As such, a video data stream can be compressed in a temporal resolution and/or in a spatial resolution.

Figure 2:
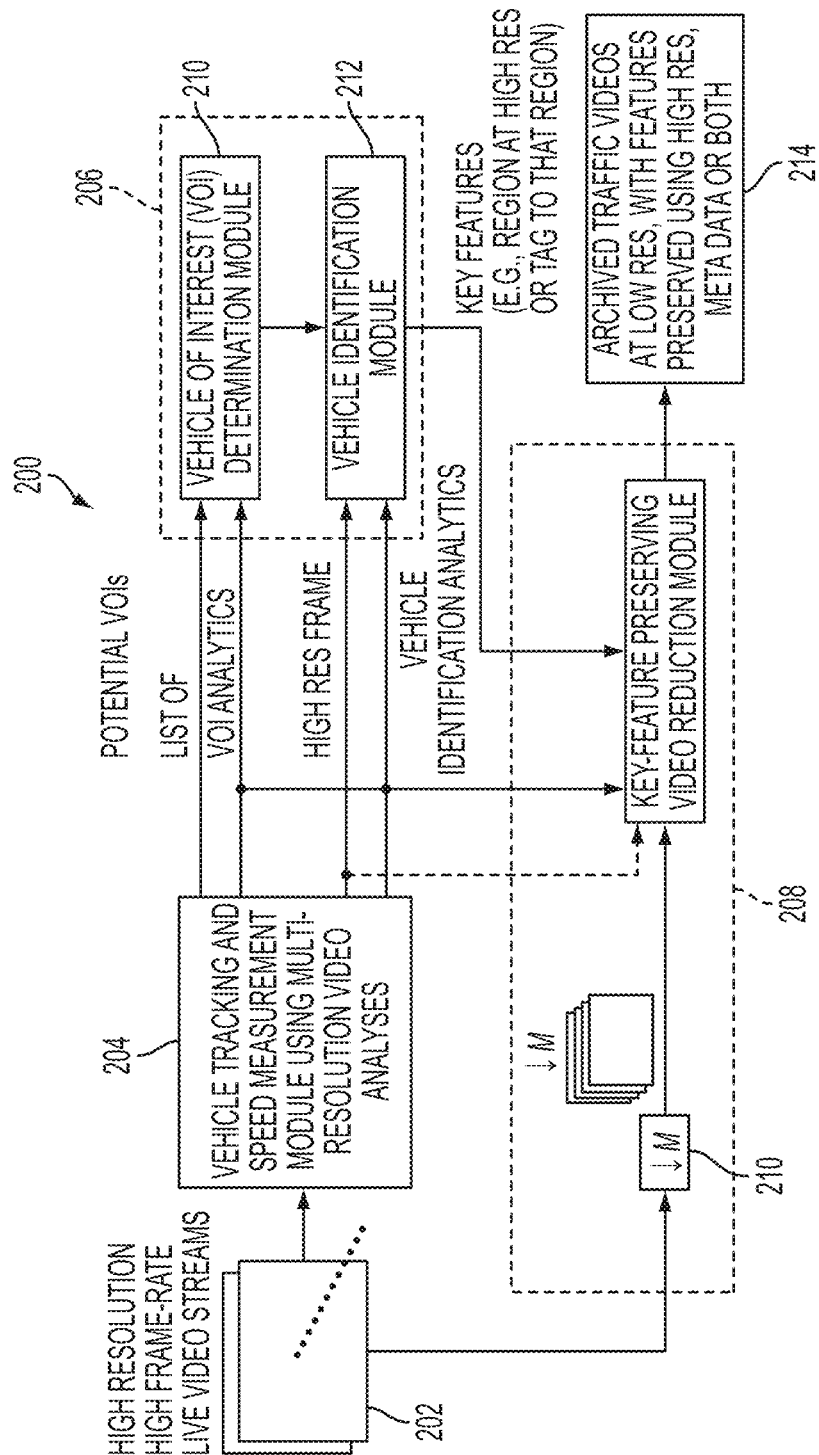
FIG. 2 is an illustration of one aspect of an exemplary embodiment of a video analysis system in accordance with the present disclosure.

Referring to FIG. 2, illustrated is a system 200 for analyzing, tracking and archiving video data, such as a video-based analysis and tracking system 200. Video data is originally captured by a high resolution, high frame rate video acquisition module 202. The video data comprises high resolution, high frame-rate video frames that is captured by the acquisition module, which includes a video camera or other image capturing device.

The acquisition module 202, for example, can operate in a 4M-pixel (1728×2304) spatial resolution with a video frame rate of 60 frames per second. However, other resolutions and frame-rates may also be used and the acquisition module 202 of the present disclosure is not limited to any one specific resolution or frame-rate for acquiring video data. The acquisition module 202 operates to capture a region of interest or field of view with the module operating under certain parameters that may include settings such as sharpness, gamma, cinelook, shutter speed, frame rate, exposure time, and any other settings of the image capture device that may be defined for the environment.

The acquisition module 202 is communicatively coupled to a vehicle detection module 204, a vehicle analysis module 206 and a subsampling module 208 and communicates video data streams continuously in real time to each module. The vehicle detection module 204 is configured to detect vehicles within a region of interest and track their progression. The vehicle detection module 204 considers multiple resolutions throughout the video processing. The video detection module 204 can extract high-level traffic analytics such as traffic flow (count and average speed), lane-change patterns, statistics related to vehicle size and type, stopped vehicles etc., for traffic monitoring and optimization, which may be performed in a low or medium level resolution. However, the resolution used for these applications typically does not meet the requirements for some other transportation applications, such as speed enforcement and AMBER Alert due to the need for accurate and archival vehicle identification. This imposes a challenge for real-time or near real-time processing applications. Therefore, the image capturing device or acquisition module 202 captures live video stream data in a high spatial resolution, high frame-rate video data stream in order to be used for multiple applications including speed enforcement and AMBER Alert monitoring and communicates the high resolution video stream data to the vehicle detection module 204 as well as the vehicle analysis module 206 and the subsampling module 208.

A function of the vehicle detection module 204 is to apply object detection and tracking algorithms using multi-resolution methods as needed while keeping some high-level video analytics for later use, such as to be communicated to the subsampling module 208. In one embodiment, the vehicle detection module 204 is configured to receive the high frame rate, high resolution video data frames of a first resolution and analyze the frames in lower resolution image frames for vehicle detection. The vehicle detection module 204 further tracks the vehicle using object detection, feature matching, template matching, particle filtering and/or like algorithms in medium or full resolution image frames. In addition, the vehicle detection module 204 selects full image or high resolution image frames having the potential vehicle of interest therein to be communicated downstream together with the detection and tracking analytic data to the vehicle analysis module 206 and/or the subsampling module 206 for later use. Therefore, the vehicle detection module 204 communicates running outputs including vehicle analytic data such as (1) the trajectories of potential VOIs, (2) the speeds of potential VOIs, (3) full-resolution image frames representing the VOIs (when they are detected at a designated optimal location), and other vehicle analytics (such as vehicle features, size, average colors, vehicle color, vehicle make, vehicle model, vehicle type, license plate, observable defects, geometric measures, facial data of driver and/or passengers and other desirable data tracked). Further details of the vehicle detection module 204 are discussed infra.

The vehicle analysis module 206 receives vehicle analytic data from the vehicle detection module 204 as well as an active list of potential VOIs, which is continuously updated, and high resolution frame video data. The vehicle analysis module 206 includes a vehicle of interest (VOI) determination module 210 and a vehicle identification module 212. A VOI is a vehicle that, according to a mode of operation of the system 200, requires its identity (through key feature preservation) preserved within the archived lower-resolution video (e.g., for later court challenges on a speeding ticket, court evidence for proof of presence or for other archival purposes). The VOI determination module 210 is configured to filter out potential VOIs (i.e., all vehicles that appear in the region of interest over time) from VOIs. The filtering process is dependent upon a mode of operation of the system 200, such as a speed enforcement mode, an AMBER-Alert mode, a watch mode or some other mode for filtering vehicles according to a set of predetermined criteria. The set of predetermined criteria may vary depending upon the mode of operation. For example, in speed enforcement mode, vehicles exceeding a speed limit or threshold are filtered as VOIs according to tracking measurements provided to the vehicle analysis module from the vehicle detection module 204. In an AMBER-Alert mode, for example, substantially all vehicles may be determined to be a VOI. Other modes for law enforcement and vehicle video analysis may also be envisioned.

In one embodiment, the VOI determination module 210 is configured to identify a potential VOI as a VOI if its measured vehicle speed exceeds a pre-determined threshold when in speed enforcement mode, and identify all potential VOIs as VOIs when in AMBER-Alert mode. In another embodiment, it will always consider all potential VOIs as VOIs. A determination that a potential VOI is a VOI after filtering indicates or tags that a subsequently archived lower-resolution video (after key features are preserved in key feature preservation downstream as further detail below) can be off-line processed for speed enforcement and other applications which require vehicle identification.

The vehicle identification module 212 receives video data having the VOIs that have appeared in the region of interest over time from the VOI determination module 210 and it also receives high frame rate, high video resolution data from the vehicle detection module 204. According to the VOI data received from the vehicle determination module 210, the vehicle identification module 212 extracts key features from the high frame rate, high resolution video data and/or tags locations corresponding to key features therein in order to identify the vehicle and/or passengers and archive the key features for later use within a compressed reduced resolution video data stream at the subsampling module 208.

For example, the vehicle identification module 212 identifies the key features of the VOIs, such as license plate images and their corresponding license plate alphanumeric information and other features related to the vehicle analytic data that are within the high resolution video stream data. The key features are extracted from the video data stream according to the predetermined criteria for a mode of operation and the vehicle analytic data provided from the vehicle detection module 204. For transportation modes of operation, such as speed enforcement or other modes of enforcement or alert watches such as terrorist or AMBER Alerts, some key features of interest include: license plate, vehicle registration, vehicle color and type, driver and passenger facial details, other geometric data, distinguishing characteristics and/or observable defects as well as red light infractions, a stop sign infraction, wrong way driving, expired registration, tailgating violations and the like as one of ordinary skill in the art will appreciate. Not all of these features can be identified from the image frames depending on the camera position and focus, but not all are required either. Thus, the key features extracted depend upon the predetermined criteria for the mode of operation that the system 200 is operating in. For speed enforcement or AMBER Alert, for example, the license plate images would be extracted from the video data received. For example, Automated License Plate Recognition (ALPR) is one algorithm for this module. Extraction of other features, such as vehicle color, vehicle shape, vehicle type, passenger and/or driver's face, scale-invariant feature transform (SIFT), and other types of feature extraction, can be incorporated by the vehicle identification module 212. The key features can further be extracted from a result of matching test provided to the system of certain characteristics or known data. The VOI determination module discussed above may match the vehicle with known characteristic data and provide the results to the vehicle identification module 212 to extract or tag the key features corresponding to the matching test for archival in high resolution.

The subsampling module 208 is located downstream of the acquisition module 202, the vehicle detection module 204 and the vehicle analysis module 206. The subsampling module 208 is configured to receive a high spatial resolution, high frame rate video data stream from the acquisition module 202, vehicle analytic data from the vehicle detection module 204 and to also receive the key features extracted or tags to locations of the key features in regions of the high resolution video data stream from the vehicle analysis module 206. The subsampling module 208 can use decimation as a way to subsample the video data stream and compress the data received. Additionally, more advanced subsampling techniques are used that can involve interpolation or transformation of the video stream, for example.

In one embodiment, the subsampling module 208 reduces the file size of the archived traffic videos for the incoming live video streams for archived traffic videos while preserving "key-features" relevant to transportation applications. File size reduction results in lower implementation costs and reduced resources required for data transmission, storage, and other later off-line processing such as searching, matching, extracting additional transportation analytics, etc. Depending upon the mode of operation of the system 200, such as in cases where detailed vehicle/driver information is required (e.g., speed enforcement, AMBER Alert, proof of presence and the like), preserving the identified key features during the process of video reduction is performed by the key feature preserving video reduction subsampling module 208.

In one example of an aspect of the key feature preserving video reduction module 208, the key features may be sub-images of license plates of VOIs and their corresponding license plate information (as communicated from vehicle identification module 212), vehicle analytics (e.g., time of first full-appearance of vehicle, its trajectory, speed, color, type, and the like, as communicated from vehicle detection module 204), and optionally the full-resolution image frames of VOIs. Two types of data in the key features extracted by the vehicle identification module 212 and provided to the key feature preserving video reduction module 208 include image data and non-image data.

In another embodiment, all key features are stored and managed separately in a database or a plurality of databases 214, while the video reduction is done with standard techniques with the exception of insertion of indexing that links the key features. A convenient choice of an indexing point for a vehicle is the first time that the vehicle is detected by the vehicle detection module 204, or alternatively the frame for which the relevant features of the vehicle are more easily identifiable. In another embodiment, a video reduction module 208 encodes non-image key features into metadata in a video format, such as MPEG-4 and H.264, while the image key features are merged with subsampled image frames from an image buffer 210, encoded and preserved in the video compression. Subsampling by a factor of N, designated as ↓N consists of discarding N−1 samples from every group of N samples, either spatially (where downsampling consists in discarding pixels) or temporally (where downsampling consists in discarding full frames). Subsampling can be performed in different directions (e.g., vertical and/or horizontal) at different rates. For example, vertical subsampling may be performed at a rate of $N_V$, while horizontal subsampling is performed at a rate of $N_H$. The subsample rate may also be varied for different frames within a sequence. The present disclosure is not limited to any one method of subsampling. For simplicity, downsampling will refer to spatial downsampling from here forth.

In yet another embodiment, non-image key features are managed and stored in a different database of the plurality of databases 214 that links back to archived traffic videos (e.g., using video indexing or time-stamps) if the selected compression scheme does not enable meta-data. In one example, all information is kept in a single source using the MPEG-4 or H.264 standards which do support meta-data. Strategies needed to preserve the image key features mentioned above are further discussed below.

Figure 3:
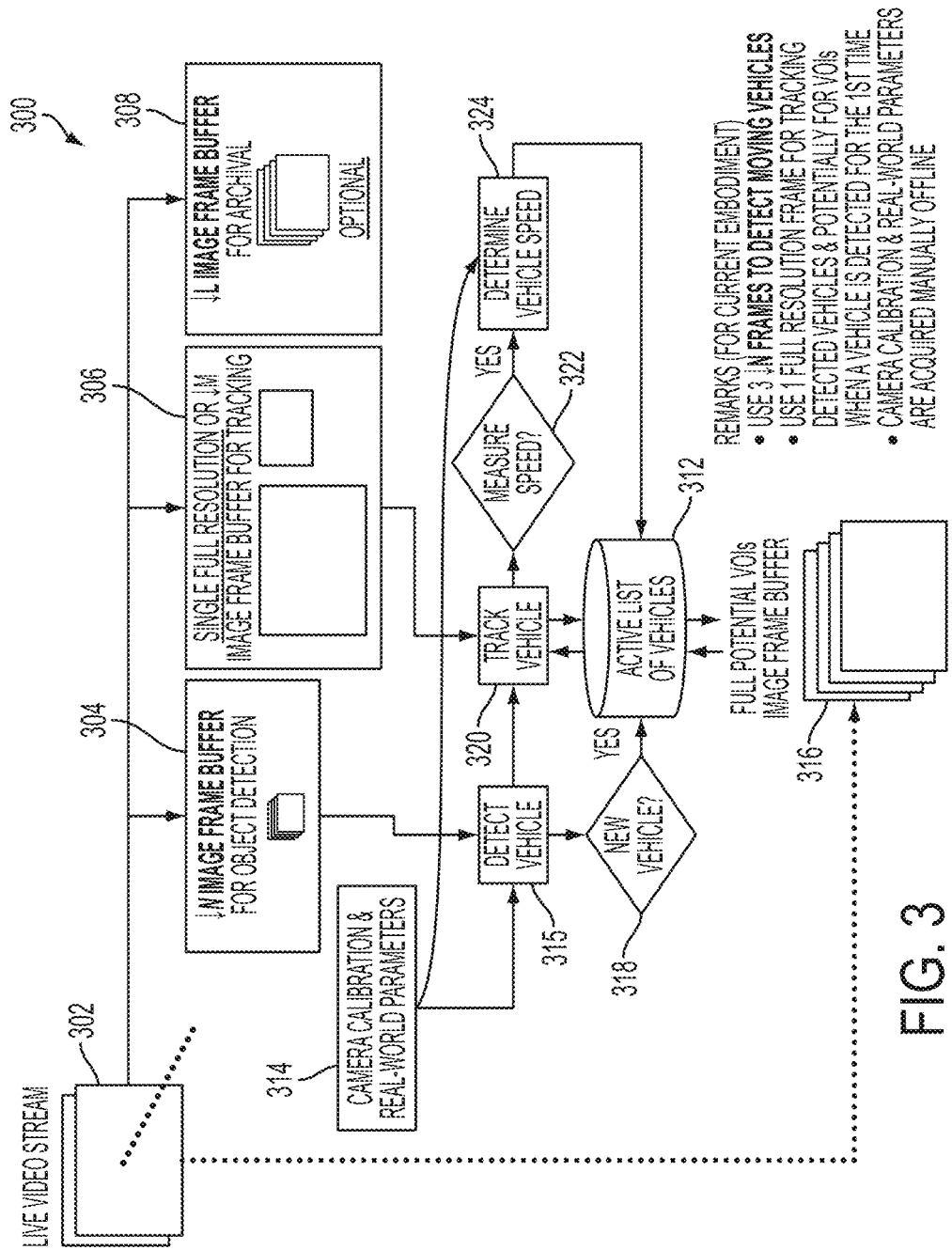
FIG. 3 is an illustration of one aspect of an exemplary embodiment of a video analysis system in accordance with the present disclosure.

Referring now to FIG. 3, illustrated is one aspect of an exemplary embodiment for a vehicle detection module 300 in a video-based analysis and tracking system. A live uncompressed video stream 302 of a Region Of Interest (ROI) is captured by a high spatial resolution, high frame-rate (in frames per second, fps) video camera. These live, full-resolution image frames being captured are continuously fed into three or four image buffers (e.g., image buffers 304, 306, and 308), which can vary in size by the number of images and can vary in resolution. Note that though we organize these image buffers based on spatial resolutions, in practice they can be all included in one image buffer or organized differently based on other criterion such as access speed requirement etc. Note also that the size of the image buffers depends on factors such as the computational/processing speed of modules (e.g., 208, 320) that use the image data and the actual traffic flow. Though it is preferred to pre-allocate sufficient image buffers in the system, it is possible to dynamically allocate variable size image buffers based on traffic flow, time of date, etc.

For example, the images in image buffer 304 can be used for vehicle detection and the buffer can consist of one or many subsampled images ↓N, (e.g., N=8 subsampling rate). In the same embodiment, the images in image buffer 306 can be used for vehicle tracking based on dynamic calculations (of vehicle and/or objects therein) with a full-resolution image frame or a different number subsampling rate ↓M, (e.g., M=2, subsample rate), and the image buffer 308 may be for video archiving subsampled at ↓L, e.g., L=2, with one or many depending on how many unprocessed video frames remain. Each frame buffer may operate therefore to subsample the video stream to a different spatial resolution and/or temporal resolution. Therefore, object detection or vehicle detection may be done with frames of a low resolution in order to use fewer resources, while tracking measurements and data of the vehicle may be done in a higher resolution than detection for greater precision detail. In addition, the archiving may be done in another different third resolution that can be any resolution, usually lower than the first high resolution video data stream captured in which identification of the key features is performed.

In addition, an image buffer 310 can be used for potential VOIs (one or many full-resolution image frames depending on how many potential VOIs remain unprocessed). The number of frames subsampled by a factor of M could differ for tracking and archiving, or be the same as in other image buffers. Using a time-stamp k as an example, at time k a processor 315 in the vehicle detection module 300 detects the presence of new vehicles (not fully seen by previous frames) using ↓N image frames stored in image buffer 304. The processor 316 determines via decision process 318 whether a new vehicle is present in the frame data from the subsampled frames having a low resolution. If the answer is yes and at least one new vehicle is detected by the vehicle detection module, the full-resolution image of frame k is added to the potential-vehicles-of-interest buffer 316 and a new tracking signal/information is added to database 312 which stores the list of active vehicles.

The vehicle detection module 300 includes one or more vehicle tracking processors 320 that track the new positions of all active vehicles at time k based on image analysis of current full-resolution or ↓M image frame k from the image buffer 306. It may also modify or remove entries from the active list of vehicles based on the tracking result. This process continues as each live image frame enters. The collected positions over time of those vehicles on the active list form their corresponding vehicle trajectories. At a desired time or if speed measurement mode is in operation at a decision 322, the speed measurement is calculated by the same or a different processor 324 based on these vehicle trajectories. In a speed measurement mode for determining the speed measurement of the vehicle detected some camera parameters or real-world parameters are provided or estimated from a parameter database 314 (e.g., relationship between physical length of the scene and image pixel unit), which may take into account camera parameters or real-world parameters 314 to the vehicle detection module as well.

As a result of the processes carried out in the vehicle detection module 300, output includes VOI analytics and vehicle identification analytics (vehicle trajectories and speeds, optionally vehicle color, type, geometric data, facial recognition data, and the like), a list of current active potential VOIs, and high resolution image frames representing the VOIs for downstream use.

In one example of an aspect of an embodiment, the high spatial resolution, high frame-rate video camera used for capturing high spatial resolution, high frame rate video stream data could have, for example, a 4M-pixel (1728× 2304) spatial resolution and be capable of acquiring video frames at 60 fps. Other high frame rates and spatial resolutions are also envisioned as one of ordinary skill in the art would appreciate. The real-world "database" 314 contains the real-world parameters/set-up that is used by the module 300. The vehicle detection is performed at ↓8 resolution (M=8, with 64× memory savings, subsampling along both spatial directions) using inter-frame differences to identify moving objects, morphological filtering to remove noises and fill in holes of moving objects, and connectivity and thresholding techniques to further identify "vehicle blobs". The vehicle tracking in this example is done by tracking at least one image feature (template) of each moving object based on max-correlation to the image template of subsequent frames. Other tracking methods based on matching color, shape, size, SIFT image features, etc. can be used for tracking as well and the present disclosure is not limited to any one combination of acts or method of tracking. For example, tracking the centroid of the vehicle blobs rather than using template matching, or using SIFT image features rather than Harris Corners for matching may be implemented in the methods disclosed herein. A predictive search (much like a Kalman filter) space and dynamic image template update (frame to frame) are also included in the tracking module to improve the performance of the algorithm (both in terms of computation and accuracy). The initial selection of an image feature when a vehicle is detected for the first time is made based on a small sub-image near the location of the pixel at which the Harris Corners energy metric is largest within the vehicle blob image. The module 300 also keeps the active list 312 of vehicles for tracking. When a new vehicle is detected at 316, it is added to the list. When the tracking position of a vehicle exits the scene, it is removed from the list in order to dynamically update the active list of vehicles database 312. In one example, a vehicle is removed from the list based on some other tracking results (e.g., the trajectory is stuck locally due to occlusion, or false alarms on moving branches of plants adjacent to the road, or some other undesired factor). The determination of whether a detected vehicle in the current frame is a new vehicle or not is made by calculating the percentage of overlap between the detected vehicle blobs and the currently tracked vehicle blobs.

Figure 4:
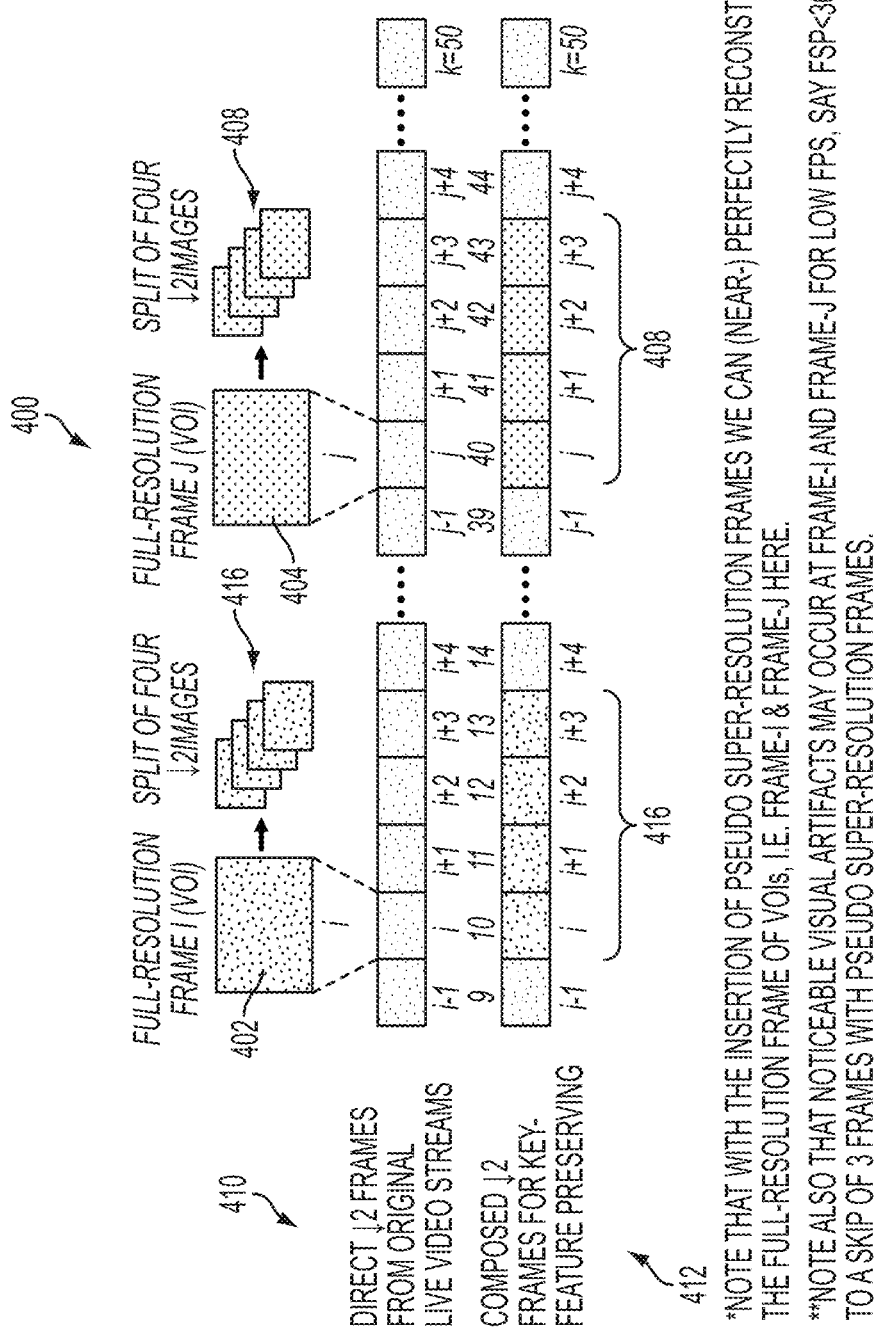
FIG. 4 is an illustration of one aspect of an exemplary embodiment of a method for a video analysis system in accordance with the present disclosure.

Referring now to FIG. 4, illustrated is one aspect of an exemplary embodiment for a subsampling module as discussed above for preserving key image key features in a reduced archive video stream.

The description of the following embodiments makes reference to terminology used in the description of predictive video encoding. A video can be thought of as a sequence of images or frames. The frame to be compressed is denoted as a target frame. Compression of a video stream can be achieved by exploiting spatial redundancies of neighboring pixels within the target frame or by exploiting temporal redundancies between the target frame and frames adjacent to it. Neighboring pixels within an image are usually highly correlated due to the smooth appearance of natural images. Spatial redundancies within the target frame are exploited by image compression algorithms, which operate in a manner similar to standard compression algorithms such as JPEG and JPEG2000. No other frames are required to exploit spatial redundancies within a target frame.

Temporal redundancies between the target frame and frames previously compressed (reference frames) are exploited by motion-compensated predictive encoding. Predictive encoding reduces temporal redundancy by building an estimate of the target frame from one or more reference frames. It breaks down the target frame into target blocks of a specific size and finds the location of the blocks in the reference frames (or reference blocks) that are most similar to the target blocks. The estimated target frame is a mosaic of the best-matching reference blocks and its encoding is efficient because reference blocks are readily available from already encoded reference frames. The smaller the blocks, the better the estimated target frame matches the real target frame. The output of the prediction model is the residual frame which results from subtracting the estimated frame from the target frame. According to the way they are encoded, target frames are classified into one of three types: I-frames are compressed in a standalone manner by only exploiting spatial redundancies between its pixels, with no prediction employed in the encoding process. P-frames are encoded by calculating the estimated frame based on past frames only, while B-frames may employ estimated frames from past and future frames. In this context, 'past' and 'future' refer to the playing order (as opposed to the encoding order) of the frames. Since decoding of P- and B-frames depends on other frames, namely, the reference frames used at encoding, I-frame decoding is much more computationally efficient, although it typically achieves smaller compression ratios. I-frames are introduced periodically to account for changes in scenery and to expedite video scrolling and searching, Without loss of generality, let us assume that two high resolution image frames for two VOIs (one for each VOI) are currently available at VOI image buffers, such as in any of the image frame buffers 304, 306, 308, and/or 310 illustrated in FIG. 3 within a high-resolution video stream, and each frame corresponding to the first time each VOI was detected in the stream. In one example, the image frames are frames number 10 and 40 (for a first vehicle V1 and a second vehicle V2 respectively) and that a total number of 50 subsampled ($\downarrow$M with M=2) low-resolution image frames (obtained by direct decimation of incoming live high resolution high frame-rate video stream) are available in the image buffers and ready to be compressed for archived traffic video. There may be only one VOI image for real-time applications, assuming video compression meets the processing speed.

FIG. 4 illustrates a proposed pseudo super-resolution frame hiding method 400 with the additional use of an I-frame (or key frame). This approach is illustrated in FIG. 4 (using M=2 as an example). In this method, each high resolution image frame 402 and 404 (target frames) of each VOI (V1 for image frames 402 and V2 for image frames 404) is split into $M^2$ $\downarrow$M images or subsample phases (with proper offset so that an optimal reconstruction is done with a high-resolution frame with pre-determined proprietary order). Each subsample phase or pseudo super-resolution frame is then inserted into the original uncompressed $\downarrow$M video stream, by either overwriting or appending $M^2$-1 $\downarrow$M frames immediately after the target frame and compressed using video compression techniques. Optionally, labeling the pseudo super-resolution frames 408 and 416 as I-frames so as to minimize potential distortion, (since I-frames are compressed in a standalone manner, with no prediction employed in the encoding process,) can be performed at the compression stage.

For example, with this approach, we first split the full resolution image frame 402, which could be frame number i=10, and frame number j=40, into four $\downarrow$2 images 406 and 408 respectively: 10*a*, 10*b*, 10*c*, 10*d* and j=40 to four $\downarrow$2 images: 40*a*, 40*b*, 40*c*, 40*d*. We then replace some of the $\downarrow$2 images within the data frames from a subsampled original live video data streams 410 having a total of k (e.g., 50) frames into the low-resolution images (e.g., 50 frames) to be compressed and archived. In particular, frames 10~13 within the frames of the video data stream 410 would be replaced with the four split images 406 corresponding to 10*a*~10*d*. The split frames 408 corresponding to 40*a*~40*d* would replace frames 40~43 with 40*a*~40*d*. Finally, the total data stream with k=50 $\downarrow$2 images is compressed into video data stream 412 by the subsampling module with video compression while optionally specifying frame 10~13 and 40~43 as I-frames, which are compressed in a standalone manner, with no prediction employed in the encoding process.

Figure 5:
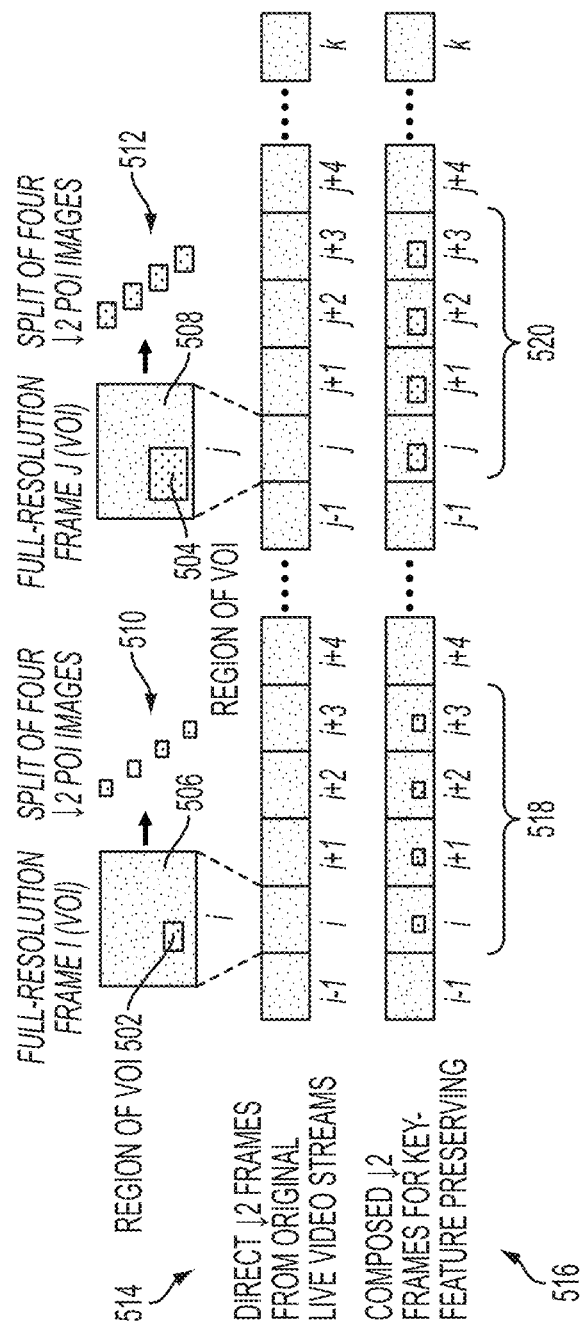
FIG. 5 is an illustration of one aspect of an exemplary embodiment of a method for a video analysis system in accordance with the present disclosure.

FIG. 5 illustrates another aspect of an exemplary embodiment for a subsampling module as discussed above. A pseudo super-resolution method 500 for encoding regions of interest (ROIs) plus use of I-frame (or key-Frame) is disclosed. The method 500 is similar to 400 illustrated in FIG. 4, but is performed by splitting frames at a region level (sub-images) rather than at an image-frame level. That is, only a portion or ROI 502 and/or 504 of high resolution image frames 506 and 508 respectively containing VOIs are split into $M^2$ $\downarrow$LM images 510 and 512. The ROIs 502 and 504 are then inserted/merged back into those sub-region sources of pseudo super-resolution ROIs to the original uncompressed $\downarrow$M video stream 514 and finally compressed using video compression techniques. Optionally, labeling the pseudo super-resolution frames 518 and 520 as I-frames so as to minimize potential distortion, (since I-frames are compressed in a standalone manner, with no prediction employed in the encoding process,) can be performed at the compression stage.

In another embodiment, the methods 400 and 500 of FIGS. 4 and 5 can utilize region-based and object-based capability in MPEG-4 & super resolution techniques knowing the "speed" and camera projective distortion of the object for this purpose. In another embodiment, a Variable Bit Rate (VBR) video encoding technique which assigns a target compression rate M-times smaller to frames containing the VOIs, or, equivalently, a bit rate M-times larger to said frames. As in the methods 400 and 500 of FIGS. 4 and 5, for example, the frames of interest are tagged as I-frames. This approach could be synergistically employed in conjunction with either method 400 or 500 to achieve higher overall compression ratios. A potential improvement in compression ratios may be achieved by tagging the frame(s) of interest as either P- or B-frames and performing the block-based prediction with smaller block-sizes than those used for the remaining frames. This would result in smaller prediction errors whose encoding would require fewer bits, which in turn would yield a better-quality decoded frame.

The methods illustrated in FIGS. 4 and 5 and related thereto may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart, can be used to implement the method for generating vehicle analysis and tracking with key feature preserving video reduction strategies described herein.

Experimental Example for Vehicle Tracking and Speed Measurement

Figure 6:
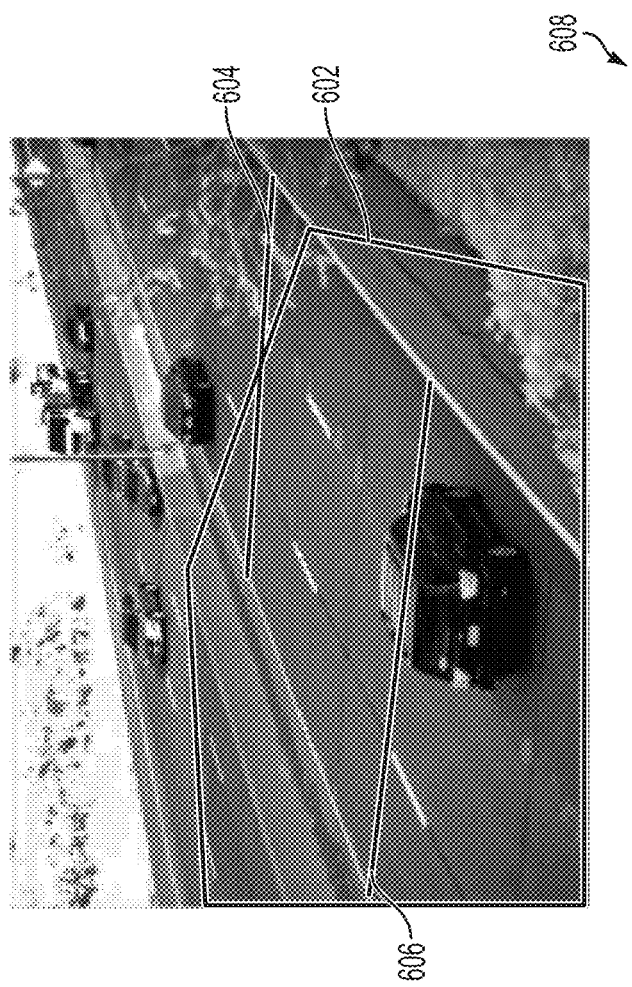
FIG. 6 illustrates a real-world set-up for analyzing traffic videos and a comparison of results in accordance with another aspect of an exemplary embodiment.

In one experimental test of a video analysis system for detecting, tracking and archiving vehicle video data, five video sequences were acquired from real-world scenarios. A total of 150 vehicles (mostly cars, and one motorcycle) were acquired by a video acquisition or image capturing device. The speed limit at the scene is 55 mph. One calibration vehicle (vehicle that travels at a known constant speed of 60 mph) was used to aid the real-world set-up and calibration tasks. FIG. 6 illustrates the real-world set-up used throughout this experiment. The area contained within boundary lines 602 is the vehicle detection region. The entire view is the tracking region. The two lines 604 and 606 are used as virtual loops for speed calculation after the tracking in a speed mode of operation. Line 604 and line 606 are separated by about 50 feet (as measured by the calibration vehicle). Table 608 illustrates the results with and without the multi-resolution scheme for the vehicle detection module. As shown in Table 608, the vehicle detection accuracy (# of correct detection, misses and false-alarms) and the vehicle speed estimation accuracy are almost identical, while the multi-resolution scheme is 2.4× faster and uses ~4× less memory. Although the image size is reduced by a factor of 64 when performing vehicle detection, a full resolution image is used for tracking, which provides further accuracy in the speed measurement. This accounts for differences in execution time, and the vehicle detection and speed estimation accuracies are preserved.

Figure 7A:
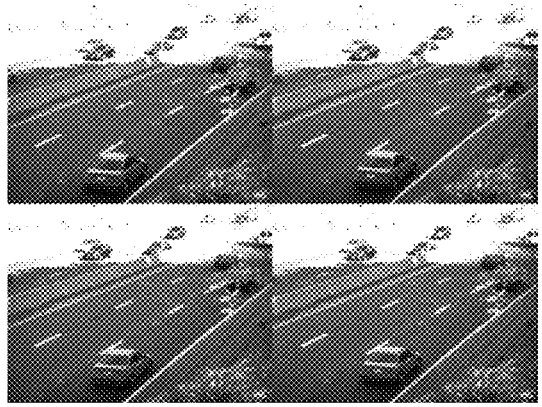
FIG. 7 illustrates an example of video frames sampled according to aspects of different methods described herein in accordance with another aspect of an exemplary embodiment.
Figure 7B:
Figure 7C:

FIG. 7 illustrates a further example of sets of video frames 702, 704 and 706 after the initial detection of a first vehicle (frames 23~26) for three methods: (a) naive $\downarrow$2 subsampling, (b) method 400 of FIG. 4 with video compression, (c) method 400 of FIG. 4 without video compression. To illustrate the concept of the module, we implemented method 400 with and without video compression using MATLAB and applied these implementations to one of the traffic videos. In the video illustrated (200 frames at 60 fps), five vehicles appear completely in the scene and are correctly detected by the vehicle detection module of the system that is discussed above. As a result, five image frames (at k=23, 101, 114, 161 and 169) that are stored at high resolution in the VOI image buffers, along with the full 200 $\downarrow$2 subsampled frames (where $\downarrow$2 is relative to the original high resolution). By comparing FIG. 6(b) and FIG. 6(c) to FIG. 6(a), it is clear that there are some artifacts in the methods (at the given vehicle speed) but they are very minor. Visual examination of 3 archived traffic videos, however, does not show any noticeable artifacts.

Figure 8A:
FIG. 8 illustrates an example of video frames sampled according to aspects of different methods described herein in accordance with another aspect of an exemplary embodiment.
Figure 8B:
Figure 8C:

FIG. 8 illustrates the resulting image magnified around the license plate of the first vehicle (partially blocked to protect the identity of the vehicle). As shown in FIG. 8, the methods of FIG. 7 indeed preserved the key feature of interest, in this example being the license plate data. Note that while text is still legible, MATLAB compression does degrade the quality significantly. This can be easily be overcome with object-based/region-based MPEG-4 compression or by making sure pseudo super-resolution frames are specified as I-frames (or B-frames with smaller prediction blocks) when performing video compression. Implementation of those improvements could yield results that are closer to FIG. 8(c) than to FIG. 8(b).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A video-based analysis system comprising:
an image capturing device that captures video stream data having video data frames at a first high resolution;
a vehicle detection module that detects at least one vehicle within the video data frames;
a vehicle analysis module that analyzes the video data frames containing the detected vehicle and to extract or tag one or more key vehicle features from the video data frames to enable identification of a vehicle of interest (VOI) according to a set of predetermined criteria, wherein the vehicle analysis module includes a vehicle of interest determination module that filters vehicles detected to determine which vehicles are VOIs according to the set of predetermined criteria that are selected for filtering vehicles detected depending upon a mode of operation, wherein the set of predetermined criteria includes a measured speed exceeding a speed threshold, a red light infraction, a stop sign infraction, wrong way driving, expired registration, and a tailgating violation; and
a subsampling module that creates a reduced resolution video stream in a second subsampled resolution that is lower than the first high resolution while maintaining the one or more extracted key features within the reduced resolution video stream in the first high resolution, and archives the reduced resolution video stream into a video database.

2. The system of claim 1 wherein the vehicle detection module detects and tracks the vehicle in different resolutions respectively that are lower resolutions than the first resolution while keeping a portion of the video data frames in the first high resolution for analysis by the vehicle analysis module.

3. The system of claim 2, wherein the key vehicle features include one or more of vehicle trajectory, measured vehicle speed, vehicle color, vehicle make, vehicle model, vehicle type, license plate, observable defects, geometric measures, and facial data of driver or passengers, and are extracted or tagged by the vehicle analysis module based on portions of data frames within the first high resolution video stream data having the vehicle, the vehicle having been identified as a vehicle of interest according to the predetermined criteria, and vehicle analytic data provided by the vehicle detection module located communicatively upstream.

4. The system of claim 3, wherein the key vehicle features further include a result of a matching test to a provided vehicle alert and wherein the portions include a region of interest within each selected frame or entire frames within the stream data.

5. The system of claim 1, wherein the subsampling module maintains the at least one of the extracted key features by preserving a region of interest within frames having the vehicle detected at a spatial resolution higher than the subsampled resolution.

6. The system of claim 1, wherein the subsampling module maintains the at least one of the extracted key features by embedding metadata into the video data stream archived in the video database, the metadata including vehicle analytic data based on dynamic calculations of the vehicle and objects therein, and vehicle identification data for characteristics of the vehicle and geometric objects therein.

7. The system of claim 1, wherein the subsampling module reduces spatial resolution, temporal resolution or bit depth of the video data stream to create the reduced resolution video stream by splitting full resolution frames having the key features and replacing the split full resolution frames, or regions within the full resolution frames, having the key features with uncompressed frames and designating the replaced high resolution frames as I frames that are compressed with no prediction when being encoded.

8. The system of claim 1, wherein the vehicle analysis module comprises a vehicle identification module that extracts the key features according to the mode of operation in one or more video data frames from the video stream data having the VOI identified, wherein the key vehicle features include vehicle color, vehicle make, vehicle model, vehicle type, license plate data, observable defects, geometric measures, and facial data of driver or passengers.

9. The system of claim 8, wherein when the mode of operation includes a speed enforcement mode the vehicle of interest determination module filters vehicles according to the measured speed exceeding the speed threshold and the predetermined criteria selected include at least the license plate data, when the mode of operation includes an AMBER-Alert mode substantially all vehicles are determined to be VOIs.

10. A video-based analysis and tracking system comprising:
a vehicle analysis module that analyzes video data frames containing a detected vehicle and extracts a plurality of key vehicle features from the video to identify a vehicle of interest (VOI) according to a set of predetermined criteria and vehicle analytic data provided thereto, wherein the vehicle analysis module includes a vehicle of interest determination module that filters vehicles detected to determine which vehicles are VOIs according to the set of predetermined criteria that are selected for filtering vehicles detected depending upon a mode of operation; and
a subsampling module that reduces resolution of the video stream data to a second lower resolution that is at least one of a spatial resolution and a temporal resolution while maintaining at least one of the extracted key features in the first resolution and archives the video at the second resolution into a video database.

11. The system of claim 10, wherein the vehicle analysis module includes a vehicle of interest determination module that identifies a vehicle of interest according to the set of predetermined criteria pertaining to vehicle analytic data collected from potential vehicles of interest, and a vehicle identification module that extracts the key features in one or more video data frames having the first resolution from the video stream data having the VOI identified.

12. The system of claim 11, further comprising:
a vehicle detection module that detects the potential vehicle of interest and determines the vehicle analytic data from the potential vehicle of interest in one or more video data frames, wherein the vehicle detection module further tracks the vehicle in at least one different resolution than for detecting the potential vehicle based upon a different size and resolution of different image frame buffers for detecting and tracking.

13. The system of claim 10, wherein the subsampling module merges and compresses video frames subsampled by an image frame buffer of the subsampling module with image frames of the VOI in the first resolution higher than the second resolution and corresponding extracted key vehicle features, as well as with metadata pertaining to the VOI and having the vehicle analytic data to create the video data stream in the second resolution archived.

14. The system of claim 10, wherein the subsampling module archives the video data stream by reducing the resolution and compressing the video data stream by using predictive video encoding that includes estimating a target frame or a portion of the target frame based on past frames or future frames and compresses only a difference between an estimated frame and the target frame.

15. A method for a video analysis system executed via at least one processor with a memory storing executable instructions to execute the method, comprising:
capturing video stream data having video data frames at a first high resolution in an image capture device;
detecting a vehicle within the video data frames with a detection module;
extracting one or more key vehicle features from the video data frames having the vehicle detected;
identifying a vehicle of interest according to a set of predetermined criteria related to vehicle analytic data from the video frames having the vehicle detected;
filtering vehicles detected to determine which vehicles are VOIs according to the set of predetermined infraction criteria that are selected for filtering vehicles detected depending upon a mode of operation; and
reducing the resolution of the video stream data with a subsampling module to a video data stream having a second resolution while maintaining one or more extracted key features in the first resolution that is a higher resolution than the second resolution.

16. The method of claim 15, further comprising:
archiving the video stream data reduced by the subsampling module and having the key vehicle features extracted in the first resolution in a database together with metadata having at least one of vehicle information and the vehicle analytic data.

17. The method of claim 15, wherein the key features include image data and non-image including one or more of vehicle trajectory, measured vehicle speed, vehicle color, vehicle make, vehicle model, vehicle type, license plate, observable defects, geometric measures, facial data of driver or passengers.

18. The method of claim 15, wherein reducing the resolution of the video data stream includes compressing the video data stream by using predictive video encoding of the video data stream that includes estimating a target frame or a portion of the target frame based on past frames or future frames and compressing only a difference between an estimated frame and the target frame.

19. The method of claim 15, wherein archiving the video data includes encoding non-image data of the key features into metadata in a video format and merging the image data with the video data frames reduced to the second resolution, wherein the vehicle analytic data includes at least one of a vehicle trajectory, a vehicle speed, facial data and one or more vehicle characteristics and wherein the key features include a license plate image and license plate data of the VOI in the first high resolution.

20. The method of claim 15, wherein reducing the resolution of the video data stream includes merging and compressing includes the video data stream with the key features having a higher resolution than the second resolution using a variable bit rate (VBR) technique that includes assigning a target compression rate to one or more video data frames containing the VOI.

21. The method of claim 15, wherein reducing the resolution to the video stream data includes merging video data frames having a subsampled resolution, the vehicle analytic data related to the VOI, and video data frames having the first resolution and the corresponding key feature having a higher resolution than the second resolution by splitting at least a portion of a target frame that is subsampled by a subsampling module into one or more subsampled phase images and replacing at least a portion of subsequent frames to the target frame with the at least a portion of subsampled phase images.

* * * * *